Aug. 11, 1959  G. B. RICHARDS  2,898,927
LIQUID VALVES
Filed May 3, 1956  2 Sheets-Sheet 1
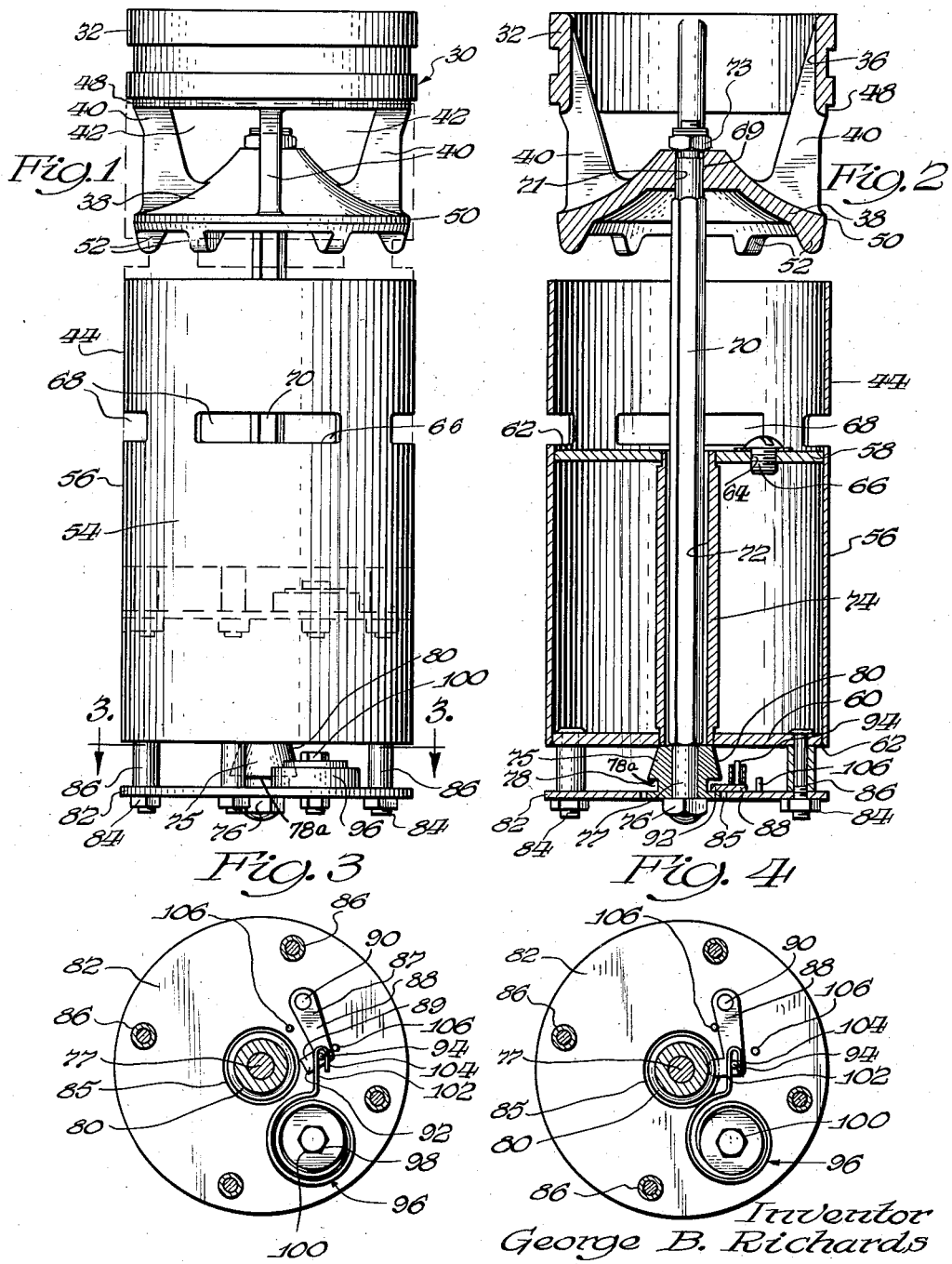

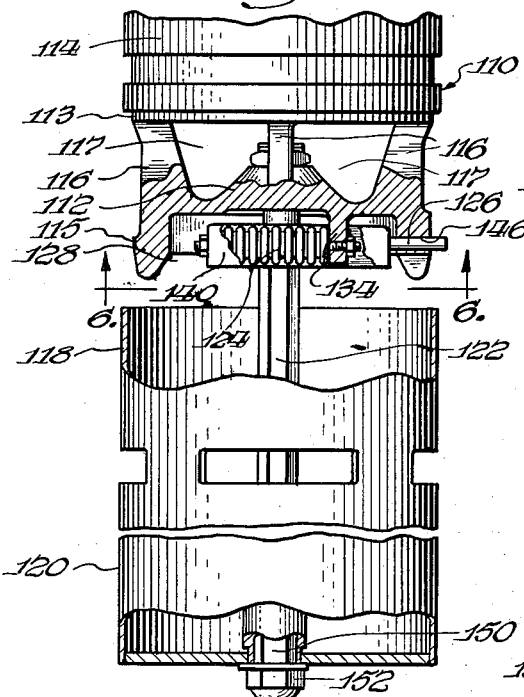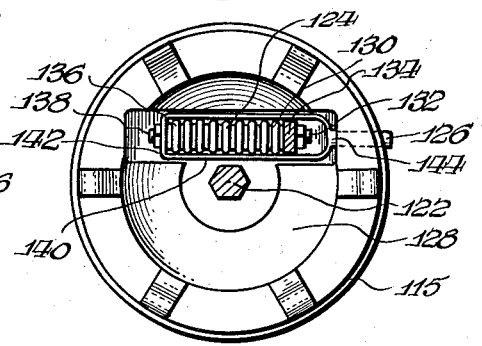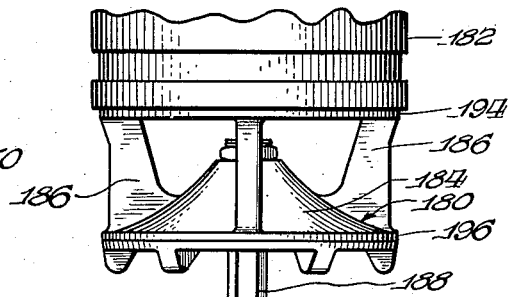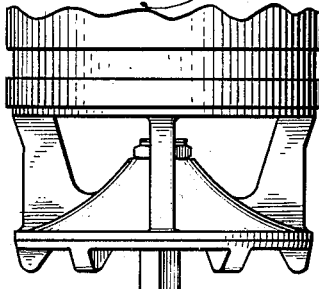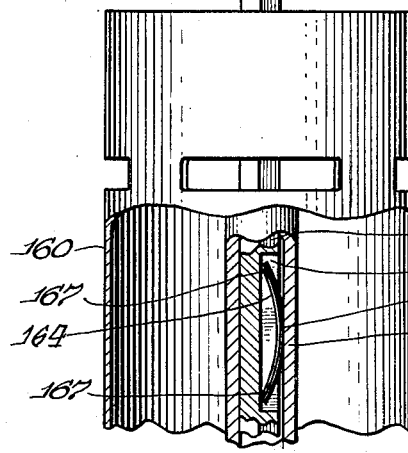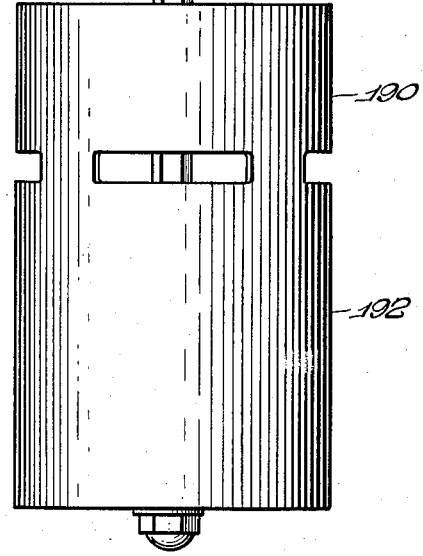

United States Patent Office 2,898,927
Patented Aug. 11, 1959

2,898,927

LIQUID VALVES

George B. Richards, Deerfield, Ill., assignor to Liquid Controls Corporation, North Chicago, Ill., a corporation of Illinois Application May 3, 1956, Serial No. 582,580

13 Claims. (Cl. 137—79)

This invention relates to liquid valves and has to do more particularly with a float-controlled valve having means for inactivating the valve under predetermined temperature conditions.

Valves, wherein the opening and closing is effected by the movement of a float buoyantly supported by a liquid, find frequent application to situations in which the float has but marginal buoyancy in the supporting liquid. This type of application most commonly arises when the float is adapted to sink in the lighter and to be buoyantly supported by only the heavier of two liquids having different specific gravities, such as in applications as water locking valves or water segregators, used extensively in fuels-handling systems, where water, such as water of condensation, commonly accumulates. These valves are designed to function cooperatively in a system, such as a fuels-handling system, to assure that no water will be withdrawn from the tank with the fuel. Such a valve is generally of the float actuated type, and includes a float adapted to sink in the lighter liquid, such as fuel, and to float on the heavier liquid, such as water. However, such applications find only a small differential in the specific gravities of the liquids, and the buoyancy characteristics of the floats must be critically limited within that small differential. Accordingly, even slight variations in the specific gravities of one or both of the liquids may affect the operation of the valves.

Water locking valves, water segregators and other float-controlled valves are commonly used in fuels-handling systems within a temperature range of from +170° F. to —65° F. Since the specific gravity of a liquid increases with a decrease in temperature, it results that a float adapted to sink in a liquid lighter than water and to be buoyantly supported by water throughout a certain temperature range, will have no differential in specific gravities within which to operate when the specific gravity of the lighter liquid nears unity. Accordingly, just as the float is adapted to be buoyantly supported by the water, so also will it be supported by the formerly lighter liquid when the specific gravity of that liquid increases sufficiently.

With certain combinations of liquids, such as JP–5, a petroleum derivative used as a fuel for jet aircraft and having a specific gravity of .82 at +60° F., and water, a float adapted to sink in JP–5 and to be buoyantly supported in water at temperatures above 32° F. will become buoyantly unstable in the JP–5 as the ambient temperature drops to 32° F. and as the specific gravity of the JP–5 nears unity. Such a situation will result in the float becoming buoyant in the JP–5 in which it is supposed to sink, whereupon if the float be that of a water locking valve, it may respond to the presence of JP–5 to close that valve even in the absence of water, or if the float be that of a water segregator or dump valve, it may open that valve even in the absence of water, with an attendant dumping or discharge of JP–5 rather than water.

Inasmuch as water freezes at +32° F., its presence at sub-freezing temperatures does not constitute the problem that water presents at higher temperatures, and water locking valves and water segregators need not function at temperatures lower than that to prevent withdrawal of water with water-immiscible liquids. It is important, however, that a water locking valve or a water segregator be inactivated when the temperature drops to a point where the float is buoyantly supported by a liquid in which it is supposed to sink, if the liquids-handling system is to operate properly.

An object of this invention is to provide a new and improved float-controlled valve.

Another object is to provide a float-controlled valve for liquids which is adapted to function throughout a predetermined temperature range, but which is inactivated when the temperature of the liquids falls below that range.

Another object is to provide a float-controlled valve adapted to be buoyantly supported by only the heavier of two immiscible liquids having different specific gravities throughout a predetermined temperature range, which valve is adapted to be inactivated when the float tends to be buoyantly supported by the lighter of the liquids.

Yet another object is to provide a float-controlled valve responsive to changes in the level of the heavier of two immiscible liquids having different specific gravities throughout a predetermined temperature range, which valve is inactivated when the differential in specific gravities of the liquids is less than a predetermined amount.

A further object is to provide a float-controlled valve responsive to changes in the level of the heavier of two immiscible liquids having different specific gravities throughout a predetermined temperature range, which valve is inactivated when the specific gravity of the lighter of the liquids is greater than a predetermined amount.

A still further object is to provide a float-controlled valve adapted for use throughout a predetermined temperature range, which need not be removed from or reinstalled in a liquid system as the ambient temperature varies within or without the predetermined range.

Another object is to provide a float-controlled valve which is extremely simple in construction, inexpensive to manufacture and which is not likely to get out of order over a long period of use.

Other objects and advantages of this invention will appear from the following detailed description taken in connection with the appended drawings, in which:

Fig. 1 is a side elevational view of a valve, constructed in accordance with the principles of this invention, shown open and in position for use as a water-locking valve;

Fig. 2 is a vertical sectional view of a the valve of Fig. 1;

Fig. 3 is a transverse sectional view taken on line 3—3 of Fig. 1;

Fig. 4 is a transverse sectional view of Fig. 1, with the locking member shown in locking position;

Fig. 5 is a side elevational view of a modification of the valve shown in Fig. 1, with portions thereof broken away and in section;

Fig. 6 is a transverse sectional view of the valve of Fig. 5 showing the lower side of the valve seat member;

Fig. 7 is a side elevational view of another modification of the valve of Fig. 1, with a portion thereof broken away and in section; and Fig. 8 is a side elevational view of yet another modification of the valve of Fig. 1.

The valve of the present invention is capable of use in a number of different applications. However, it is especially well-adapted for use as a water locking valve, and, for the purpose of illustrating the invention, it is herein described in such an application, although it will be understood that the invention is not so limited.

My valve advantageously has a generally cylindrical shape and employs a cylindrical, sleeve-like valve member adapted to be moved axially into and out of encircling relationship with a valve seat member. It is generally similar to and an improvement upon the valve disclosed and claimed in my copending application Serial No. 530,551, filed August 25, 1955, now Patent No. 2,821,994 granted Feb. 4, 1958, to which reference may be had for a more detailed recitation of the construction and operation of the basic elements thereof.

Referring now particularly to Figs. 1 and 2 of the drawings, I have illustrated a preferred form of float-controlled valve constructed in accordance with my invention. The valve is shown as a water locking valve adapted to be installed on the intake end of a withdrawal pipe (not shown) extending within a tank.

The valve includes a seat member 30 having a coupler or connector portion 32 which preferably takes the form of a "grooved flange" adapted to receive a coupling element (not shown) by which the valve is attached to a withdrawal pipe (not shown). An axially directed outlet port 36 is provided through the connector portion 32 so as to be in correspondence with the withdrawal pipe.

An end wall 38 is fixedly disposed opposite the outlet port 36 and in alignment therewith, the end wall being rigidly supported from the connector portion 32 and in spaced relation therewith by means of a plurality of circumferentially spaced ribs 40 extending from the connector portion to the end wall and integral with both such elements. The spaces between the successive ribs form a plurality of radially directed inlet ports 42 which communicate directly with the axially directed outlet port 36. The end wall 38 preferably has a generally conical shape, with the upper surface thereof being concavely arcuate to induce a streamlined flow of liquid between the radially directed inlet ports 42 and the axially directed outlet port 36.

A movable valve member 44 is provided to close the inlet ports 42, and takes the form of a cylindrical sleeve adapted to slide axially over the end wall 38 into encircling relationship with the inlet ports. A cylindrical seating surface 48 on the connector portion 32 and a cylindrical seating surface 50 on the end wall 38 are provided to accommodate the valve member, and have diameters slightly smaller than the inner diameter of the sleeve. A plurality of circumferentially spaced lugs 52 extend downwardly from the periphery of the end wall 38, each of which lugs has a downward taper adapted to facilitate the passage of the valve member 44 over the seating surface 48 and 50.

Secured to the valve member 44 is a float 54 which may be of any suitable form but which preferably is formed integrally with the valve member. This is conveniently accomplished by forming a cylindrical side wall 56 for the float as an extension of the cylindrical valve member, while a top wall 58 and a floor 60 are peripherally connected as by welding or soldering at 62 to the float side wall. An opening 64 in the top wall 58, for which a threaded closure plug 66 is provided, permits access to the float interior so that the float may be accurately adjusted to the liquids in which it must sink or in which it must float, by the addition or removal of weights or weighting materials.

A plurality of apertures 68 are provided in the cylinder forming the valve member 44 and the float 54 adjacent and slightly above the point of connection of the top wall 58 to the side wall 56. These apertures comprise a venting means to reduce the liquid resistance to the piston effect of the end wall 38 in the cylindrical valve member 44 as the latter reciprocates up and down into and out of closing relationship with the inlet ports 42.

The float 54 and the valve member 44 are guided for vertical movement toward and away from the seat member 30 and are retained against lateral displacement from alignment with the cylindrical seating surfaces 48 and 50 by an elongate guide stem 70 which has an upper tapered end 69 extending axially through a tapered opening 71 in the end wall 38 and tightly secured therein as by a cap nut 73 threaded onto the upper end of the stem 70. The float 54 has a passage 72 extending longitudinally therethrough, which passage is defined by a tubular member 74 sealingly secured to both the top wall 58 and to the floor 60 of the float. This passage 72 accommodates the guide stem 70 for free sliding movement therein and serves to keep the valve member 44 in alignment with the end wall 38 and to prevent displacement of the float in any but a reciprocal vertical direction.

The downward travel of the float 54 and the valve member 44 are limited by a washer 75 fixed to the guide stem 70 as by a cap nut 76 threaded onto the lower end 77 of the guide stem. The washer 75 is of greater diameter than the passage 72 and accordingly provides a bottom limit stop for the float 54. The washer 75 is provided with an annular groove 78 forming a laterally extending shoulder 78a and an inward taper 80 upwardly therefrom for purposes hereinafter described.

In order to provide support for mechanism adapted to lock the float 54 and the guide stem 70 together and against relative movement, a platform 82 is provided in spaced relationship with the float floor 60, and is rigidly supported therefrom by fastening means such as a plurality of bolt assemblies 84 which constrict the platform and the float floor toward each other against a plurality of divider tubes 86 which are interposed therebetween and through which the bolt assemblies pass. The platform 82 is provided with a central bore 85 of diameter sufficient to freely pass the guide stem 70 and the washer 75 therethrough.

A locking member 88 (see especially Figs. 3 and 4) is connected to the platform 82 as to be pivotable thereon at one end about a pivot pin 90, so that a second end 92 of the locking member may be moved into and out of engagement with the groove 78 of the washer 75. The locking member suitably takes the form of an L having arms 87 and 89, and carries a pin 94 upstanding therefrom in the area of the juncture of the two arms for purposes hereinafter set forth.

The actuating means for the locking member comprises a coiled, resilient, thermally-responsive, bimetallic strip 96 rigidly connected at its center end 98 to the platform 82 as by means of a bolt 100. The outer end 102 of the strip 96 is provided with a loop 104 adapted to receive the upstanding pin 94, and since angular movement of the locking member 88 about the pivot pin 90 imparts to the upstanding pin 94 a certain amount of reciprocal motion radially of the coiled strip 96, the loop 104 is elongated to maintain its accommodation of the upstanding pin throughout the path of reciprocation of the latter. The coiled strip 96 is so disposed and positioned relative to the locking member 88 that upon a drop in the ambient temperature the coiled strip tends to uncoil, with the result that it pushes against the upstanding pin 94 to urge the second end 92 of the locking member pivotally toward the guide stem.

The locking member 88 is limited in its angular movement about the pivot pin 90 between two limit stops 106, such as in the form of pins, upstanding from the platform 82 and straddling the locking member 88.

In the use of the valve, the connector portion 32 is is fixed to the lower end of a withdrawal pipe (not shown) extending into a tank, such that the inlet ports 42 are disposed at the bottom of the tank proper, with the float 54 and the valve member 44 being positioned below the inlet ports and extending down into the sump of the tank. The float is adjusted, as by the addition or removal of weight, to the specific gravities of the two immiscible liquids in which the valve must operate, as for example, JP–5 and water, so that upon the presence of both liquids and at ambient temperatures over 32° F., it will float on the water, the heavier of the two liquids at temperatures over 32° F., and sink in the JP–5. For use in JP–5, the coiled bimetallic strip 96 must be so adjusted that only at 32° F. and lower ambient temperatures will it uncoil sufficiently to move the locking member 88 into engagement with the annular groove 78 in the washer 75, the temperature 32° F. and lower temperatures being temperatures where the density of JP–5 is so close to the density of water that the JP–5 will buoyantly support a float which water will buoyantly support. Accordingly, under the above-freezing ambient temperature conditions the valve will function as though there were no thermostatic control present, and upon the level of any water in the tank reaching a point close to the inlet ports 42, the float will have moved the valve member 44 (shown in broken lines in Fig. 1) into closing relationship with the inlet ports 42 to prevent withdrawal of water with the JP–5.

On the other hand, when the JP–5 and water are at sub-freezing temperatures, the coil bimetallic strip will have uncoiled sufficiently to have moved the locking member toward the guide stem 70 to a point where the locking member 88 would engage the annular groove 78 if the float 54 were in its bottom-most translational position where the locking member 88 and the groove 78 would be in register. If the strip 96 has moved the locking member 88 toward the guide stem 70 at a time when the float 54 was not at its bottom-most position, the locking member will nonetheless be guided into engagement with the annular groove 78 upon a subsequent downward travel of the float 54, by means of the taper 80 in the washer 75, which taper has a camming action upon the locking member 88 against the resilient pressure of the coiled strip 96.

Once the locking member is seated in the annular groove 78, the water locking valve will be held in open position until the coiled strip 96 withdraws the locking member 88 from the groove, as upon an increase in ambient temperature to above-freezing. Of course, at temperatures of 32° F. and lower, water freezes and does not constitute a liquids-handling problem requiring the use of either water locking valves or water segregators.

Ordinarily, when a water-locking valve is being used in a liquids-handling system, so also is a water segregator. Accordingly, there should be little possibility that the water locking valve above-described be locked in a position wherein the cylindrical valve member is in closing relationship with the inlet ports, as might result should the temperature fall while sufficient water was present in the tank bottom or sump to have previously caused the water locking valve to close. If, however, this condition should arise, an operator attempting to withdraw the desired liquid, as for example, JP–5, from the withdrawal line, would fail in his attempt and would immediately recognize the need for thawing out the system and for examination and adjustment of the water segregator.

It will be apparent that the valve of the present invention is easily adaptable for use in liquid combinations other than JP–5 and water, for the float is easily adjustable to sink in one and to float in another of the liquids, by the insertion or removal of weight or weighting materials, such as oil, into or from the float through the opening 64. The bimetallic coil 96 may likewise be easily adjusted in position so that it will respond to a particular ambient temperature, dependent on the lighter of the liquids to be handled, to move the locking member into engagement with the annular groove in the water.

A second embodiment of the invention is shown in Figs. 5 and 6. The valve includes a valve seat member 110 of generally cylindrical configuration, having a connector portion 114 and an end wall 112 of a generally conical shape. The end wall is supported in spaced relation from the connector portion by means of a plurality of circumferentially spaced ribs 116 formed integrally with both of those elements, which ribs define inlet ports 117 therebetween. Both the connector portion 114 and the end wall 112 are provided with cylindrical seating surfaces 113 and 115 respectively. A cylindrical valve member 118 and a float 120 connected thereto are maintained in operating relation with the seat member 110 by means of a guide stem 122 fixedly extending vertically down from the end wall 112, on which stem the valve member is adapted to slide axially from a position remote from the inlet ports into a position in encircling relationship therewith. Mechanism is provided for locking the float and valve member relative to the guide stem, and takes the form of a longitudinally-resilient, thermally-responsive bellows member 124, such as a Sylphon bellows, operatively connected to a projectable and retractable finger 126, the bellows being positioned so as to be able to move the latter into and out of the path of the valve member 118. To this end the bellows 124 is suitably accommodated within the cavity 128 of the conical end wall 112 and to one side of the vertically disposed guide stem 122. A first end 130 of the bellows 124 is fixedly connected, as by means of a bolt 132, to a boss 134 projecting downwardly from the lower side of the end wall 112. A second end 136 of the bellows 124 is fixedly connected, as by means of a second bolt 138, to a first end 142 of a yoke member 140 having a generally rectangular shape, with the bellows 124 and the yoke member 140 being so positioned that the yoke extends back along the bellows and straddles the latter longitudinally. The finger 126 extends from a second end 144 of the yoke member 140 as to be in general axial alignment with the longitudinal extent of both the yoke member 140 and the bellows 124, and may be formed integrally with the yoke member. The finger 126 is of relatively small cross section, and is slidably carried through a transverse bore 146 extending through the cylindrical seating surface 115 of the end wall 112.

No other locking mechanism is required for the valve, and accordingly the lowermost portion 150 of the guide stem 122 is provided merely with a cap nut 152 threaded onto the guide stem to prevent the float from passing completely thereof.

The valve is used in the manner set forth hereinbefore for the preferred embodiment, and the thermostatic bellows member responds to a lowering of the ambient temperature to and below a predetermined temperature, as for example 32° F., when the valve is being used to control JP–5, to lock the valve open. The bellows 124 contracts upon a reduction in the ambient temperature, causing the yoke member 140 to be moved such that the second end 144 of the yoke member is moved axially away from the first end 130 of the bellows 124 and toward the periphery of the end wall 112. The movement of the second end 144 of the yoke member 140 moves the finger 126 through the bore 146 until the former projects beyond the cylindrical seating surface 115, and will thus block the path of axial movement of the valve member 118 should it be urged upward by the float 120. The bellows 124 must be positioned and adjusted so that for a given liquid being handled by the valve, the bellows will project the finger 126 into the path of the valve member 118 at an ambient temperature slightly higher than the temperatures at which the float tends to become buoyant in the controlled liquid.

Since the bellows 124 is located on the fixed valve seat member 110 rather than on the movable valve member 118, the difference in volume of the bellows as it expands and contracts according to the temperature will not affect the buoyancy of the float 120.

A third embodiment of the invention is shown in Fig. 7, wherein the mechanism for locking the valve float 160 to the guide stem 162 against relative movement therebetween at or below a predetermined temperature comprises a curved bimetallic strip 164 carried loosely within a narrow elongate slot 166 disposed longitudinally in the guide stem 162 and midway between the ends thereof. The curved strip 164 is preferably disposed in the slot 166 such that the two ends 167 of the strip are innermost in the slot, with the arched center 169 of the strip being outermost and proximate to a tubular member 168 sealingly connected to the float 160 and passing vertically therethrough, through which tubular member the guide stem 162 slidably passes.

The bimetallic strip 164 has such thermoresponsive characteristics, and is so shaped, that for liquid temperatures above a predetermined temperature for the particular liquid being handled by the valve, as for example 32° F. for JP-5, the strip is relatively flat, and exerts little or no force between the guide stem 162 and the tubular member 168 to bind them together frictionally. When, however, the temperature of the liquid falls below that predetermined temperature, the bimetallic strip 164 takes a relatively sharply arched shape, and exerts a strong force between the guide stem 162 and the tubular member 168 to strongly bias those two members together in frictional engagement, thereby preventing movement of the float 160 relative to the guide stem 162 until the temperature shall have risen sufficiently.

A further embodiment of the invention is shown in Fig. 8. In this embodiment, the valve and valve seat members are formed from materials respectively having coefficients of expansion such that the differential contraction of these members resulting from a predetermined drop in temperature thereof is utilized to cause the valve member to be held inactive when the ambient temperature falls below a point where the float tends to become buoyant in the controlled liquid in which it is adapted to sink, and no additional locking mechanism is provided. Such a utilization of the differential in contraction between the differential elements of a valve turns the generally undesirable physical occurrence of differential contraction of valve elements to a useful end.

In the construction of this embodiment, the valve seat member 180 includes a connector portion 182, an end wall 184 of generally conical shape, and a plurality of circumferentially spaced ribs 186 fixed supporting the end wall from the connector portion. A guide stem 188 projects axially downward from the end wall 184 and is adapted to guide the movement of a cylindrical valve member 190 and a float 192 connected thereto in reciprocal motion toward and away from the valve seat member 180. The valve seat member further includes a cylindrical seating surface 194, while the end wall 184 has a cylindrical seating surface 196, the diameters of the seating surfaces 194 and 196 being slightly smaller than the inner diameter of the cylindrical valve member 190. Provision is made for locking the float 142 against movement relative to the guide stem 188 by forming the valve seat member 180 and the cylindrical valve member 190 of materials having different coefficients of linear expansion, with the material of which the valve seat member is formed being that of the lower coefficient. Excellent results have been achieved by forming the valve seat member 180 as a casting from a high-nickel-content steel, such as that available commercially under the trade name of "Ni-Resist," the composition being available with coefficients of linear expansion ranging from about that of cast iron to even smaller coefficients, while forming the cylindrical valve member 190 of commercial aluminum, which has a relatively high coefficient of linear expansion. "Ni-Resist" presents an additional suitability to use as a valve element, particularly for use with petroleum products, since it is very corrosion-resistant, one of the drawbacks of cast iron for this use.

The clearance between the cylindrical valve member 190 and the cylindrical seating surfaces 194 and 196 is such that throughout a predetermined range of temperatures, in which range a given liquid is to be handled, the relative expansion and contraction of the seat member and the valve member do not interfere with the operation of the valve. However, the clearance is such that at a predetermined minimum ambient temperature for that operating range, the cylindrical valve member 190, which is formed of the material of higher coefficient of linear expansion, will contract to a diameter where it will no longer pass over the cylindrical seating surfaces 194 and 196, thereby "locking" the valve open until the temperature shall once again rise above that predetermined minimum.

From the foregoing, it will be seen that the present invention provides a novel float-controlled valve of extremely simple and compact construction, and accordingly, one which may be manufactured very inexpensively. The valve requires no adjustment after installation and will require a minimum of repair or replacement of parts over a long period of use.

Furthermore, the valve is so constructed that it inactivates the valve float, and therefore the valve member, as the ambient temperature drops toward a point where the specific gravity of a liquid in which the float is designed to sink increases close to a point where the float tends to become buoyantly supported by that liquid. Thus the float-controlled valve of the present invention furnishes an optimum amount of protection for a liquid system wherein two immiscible liquids might be present, and where the system is adapted to be used in a widely varying range of temperatures. The valve is operative throughout only the portion of that temperature range in which portion a differential in specific gravities exists for the liquids, while the valve is adapted to inactivate itself at ambient temperatures below that portion, where no appreciable differential in specific gravities exists within which to balance the buoyancy of the float.

The mechanism for locking the float and valve member inactively relative to the valve seat member is simple in construction, and free from any complexity of delicate parts. Such a valve can therefore be used in a wide range of operating temperatures, for it can be left installed in a tank or tank truck even when the ambient temperatures are such that other valves would be closed in response to activation by the wrong liquid. The valve of the present invention need not be removed from its tank upon the advent of such a temperature situation, but remains installed and available for operation upon a subsequent increase in temperature to a point where a float-controlled valve is not only operative, but necessary.

While the valve has been described in its application as a water locking valve, it may also be employed in a position inverted from that shown, and may be used as a water segregator or as a dump valve for other liquids. When used in inverted position, the float is disposed above the valve seat member and is adapted to float on the water or other heavier liquid. Thus, when the level of that water or heavier liquid is sufficiently high, the float will open the valve to allow that liquid to be discharged therethrough. When the level of the liquid falls sufficiently, the float falls also to close the valve and halt further discharge. The locking mechanism functions as in the water locking valve described, to inactivate the valve at temperatures where the float becomes buoyant in the lighter liquid.

Moreover, while the valve of this invention is especially well adapted for use in fuels-handling systems, where the presence of water is a constant problem, it should be understood that it is not limited to such applications, but may be employed in any application where a float-controlled valve is balanced to operate within a differential in specific gravities between two immiscible liquids.

The expression "normal ambient operating temperature range" used herein is to be understood to mean the temperature range within which the valve is designed to open and close upon the movement of the float. That is to say, the range is the range within which the specific gravities of the two liquids are sufficiently different so that the float will be buoyantly supported by the heavier of the two liquids and will sink in the lighter of the two liquids to open or close the valve in accordance with the level of the heavier liquid.

I claim:

1. A float-controlled valve for controlling the flow of two immiscible fluids, at least the heavier of which is a liquid, said valve comprising a seat member and a movable member operatively connected to said seat member, said seat member having an inlet port and an outlet port in communication with the inlet port, said movable member including a valve member and a float ballasted to be buoyantly supported by said heavier fluid and to sink in said lighted fluid at normal ambient operating temperatures, said float being connected to said valve member for movement of the latter into and out of closing relationship with the inlet port in accordance with the level of a liquid by which the float is buoyantly supported, and temperature responsive means including mutually engageable elements on said seat member and said moval member respectively, said means being inactive within the normal ambient operating temperature range and active when the ambient temperature decreases to a predetermined value below the normal ambient temperature range for holding said movable member against movement into valve-closing position.

2. A float-controlled valve for controlling the flow of two immiscible fluids, at least the heavier of which is a liquid, said valve comprising a cylindrical seat member and a movable member operatively connected to said seat member, said seat member having an inlet port and an outlet port in communication with the inlet port, said movable member including a tubular valve member slidable over said seat member and a float ballasted to be buoyantly supported by said heavier fluid and to sink in said lighter fluid at normal ambient operating temperatures, said float being connected to said valve member for movement of the latter into and out of closing relationship with the inlet port in accordance with the level of a liquid by which the float is buoyantly supported, and temperature responsive means including mutually engageable elements on said seat member and said movable member respectively, said means being inactive within the normal ambient operating temperature range and active when the ambient temperature decreases to a predetermined value below the normal ambient operating temperature range for holding said movable member against movement into valve closing position.

3. A float-controlled valve for controlling the flow of two immiscible fluids, at least the heavier of which is a liquid, said valve comprising a cylindrical seat member and a movable member operatively connected thereto, said seat member having an inlet port and an outlet port in communication with the inlet port and including a shoulder fixed relative thereto, said movable member including a tubular valve member slidable over said seat member and a float ballasted to be buoyantly supported by said heavier fluid and to sink in said lighter fluid at normal ambient operating temperatures, said float being connected to said valve member for movement of the latter into and out of closing relationship with the inlet port in accordance with the level of a liquid by which the float is buoyantly supported, a locking member and a temperature-responsive element each carried by said float, said locking member being movable into and out of a position on the float wherein the path of movement of the locking member as the float moves in accordance with changes in the level of the supporting liquid will be blocked by said shoulder, said temperature-responsive element being connected to said locking member and inactive within the normal ambient operating temperature range and active when the ambient temperature decreases to a predetermined value below the normal ambient operating temperature range for moving the locking member into shoulder-engaging position.

4. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port, said movable member including a tubular valve member slidable over said seat member and a float ballasted to be buoyantly supported by said heavier fluid and to sink in said lighter fluid at normal ambient operating temperatures, said float being connected to said valve member for movement of the latter into and out of closing relationship with the inlet port in accordance with the level of a liquid by which the float is buoyantly supported, a locking member slidably supported by said seat member and a temperature-responsive bellows member of variable length fixed at one end to said seat member and connected at the other end to said locking member, said bellows member being inactive within the normal ambient operating temperature range and active when the ambient temperature decreases to a predetermined value below the normal ambient operating temperature range to project said locking member into the path of movement of said valve element.

5. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port, said movable member including a tubular valve member slidable over said seat member and a float ballasted to be buoyantly supported by said heavier fluid and to sink in said lighter fluid at normal ambient operating temperatures, said float being connected to said valve member for movement of the latter into and out of closing relationship with the inlet port in accordance with the level of a liquid by which the float is buoyantly supported, an elongate guide stem fixedly projecting from said seat member and adapted to slidably guide the movement of said float relative to said seat member, said stem having a longitudinal recess intermediate the ends thereof and an arcuate bimetallic member disposed in the recess, said bimetallic member being adapted to vary in curvature in accordance with the temperature between one curvature wherein the bimetallic member is tightly biased between the stem and the float when the ambient temperature decreases to a predetermined value below the normal ambient operating temperature range and another curvature wherein the bimetallic member is loosely disposed therebetween when the ambient temperature is within the normal operating temperature range.

6. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port, said movable member including a tubular valve member slidable over said seat member and a float ballasted to be buoyantly supported by said heavier fluid and to sink in said lighter fluid at normal ambient operating temperatures, said float being connected to said valve member for movement of the latter into and out of closing relationship with the inlet port in accordance with the level of a liquid by which the float is buoyantly supported, said seat member being formed of material having a lower coefficient of linear expansion than the material of which the valve member is formed, the clearance between the seat member and valve member being such that at temperatures within the normal ambient operating temperature range the valve member freely slides over the seat member, while at a predetermined temperature below the normal ambient operating temperature range the valve member contracts to a diameter smaller than the diameter of the seat member for holding said valve member against movement to valve closing position.

7. A float-controlled valve for controlling the flow of two immiscible fluids, at least the heavier of which is a liquid, said valve comprising a fixed cylindrical seat member having an inlet port and an outlet port in communication with the inlet port, and a movable member operatively connected to said seat member, said seat member including an elongate guide stem projecting axially therefrom, said movable member including a tubular valve member slidable over said seat member and a float ballasted to be buoyantly supported by said heavier fluid and to sink in said lighter fluid at normal ambient operating temperatures, said float being slidable on said stem and connected to said valve member for movement of the latter into and out of closing relationship with the inlet port in accordance with the level of a liquid by which said float is buoyantly supported, and temperature responsive means including mutually engageable elements on said seat member and said movable member respectively, said means being inactive within the normal ambient operating temperature range and active when the ambient temperature decreases to a predetermined value below the normal ambient operating temperature range for holding said movable member against movement into valve-closing position.

8. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port and including an elongate guide stem projecting axially therefrom and a shoulder extending laterally from said stem, a tubular valve member slidable over seat seat member and a float ballasted to be buoyantly supported by said heavier fluid and to sink in said lighter fluid at normal ambient operating temperatures, said float being slidable on said stem and connected to said valve member for movement of the latter into and out of closing relationship with the inlet port in accordance with the level of a liquid by which the float is buoyantly supported, said float including a locking member and a temperature-responsive element each carried by said float, said locking member being movable into and out of a position on the float wherein the path of movement of the locking member as the float moves in accordance with changes in the level of the supporting liquid will be blocked by said shoulder, said temperature-responsive element being connected to said locking member and inactive within the normal ambient operating temperature range and active when the ambient temperature decreases to a predetermined value below the normal ambient operating temperature range for moving the latter into shoulder-engaging position responsive to a predetermined temperature condition.

9. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port and including an elongate guide stem projecting axially therefrom, said movable member including a tubular valve member slidable over said seat member and a float ballasted to be buoyantly supported by said heavier fluid and to sink in said lighter fluid at normal ambient operating temperatures, said float being slidable on said stem and connected to said valve member for movement of the latter into and out of closing relationship with the inlet port in accordance with the level of a liquid by which the float is buoyantly supported, said stem having a transverse recess and a taper inward and upward from the recess, and said float including a locking member and a resilient temperature-responsive element each carried by said float, said locking member being movable into and out of a position to engage the recess, and said temperature-responsive element being connected to said locking member and inactive within the normal ambient operating temperature range and active when the ambient temperature decreases to a predetermined value below the normal ambient operating temperature range for moving the latter into recess-engaging position responsive to a predetermined temperature condition.

10. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port and including an elongate guide stem projecting axially therefrom, said movable member including a tubular valve member slidable over said seat member and a float ballasted to be buoyantly supported by said heavier fluid and to sink in said lighter fluid at normal ambient operating temperatures, said float being slidable on said stem and connected to said valve member for movement of the latter into and out of closing relationship with the inlet port in accordance with the level of a liquid by which the float is buoyantly supported, a locking member slidably carried by said seat member and a temperature-responsive bellows member of variable length fixed at one end to said seat member and connected at the other end to said locking member, said bellows member being inactive within the normal ambient operating temperature range and active when the ambient temperature decreases to a predetermined value below the normal ambient operating temperature range to project said locking member into the path of movement of said valve element.

11. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port, said movable member including a tubular valve member slidable over said seat member and a float ballasted to be buoyantly supported by said heavier fluid and to sink in said lighter fluid at normal ambient operating temperatures, said float having a walled tubular passage therethrough, said float being connected to said valve member for movement of the latter into and out of closing relationship with the inlet port in accordance with the level of a liquid by which the float is buoyantly supported, said seat member including an elongate guide stem fixedly projecting therefrom and accommodated within the tubular passage to slidably guide the movement of said float relative to said seat member, said stem having a longitudinal recess intermediate the ends thereof and an arcuate bimetallic member disposed in the recess, said bimetallic member being adapted to vary in curvature in accordance with the temperature between one curvature wherein the bimetallic member is tightly biased between the stem and the wall of the tubular passage in the float when the ambient temperature decreases to a predetermined value below the normal ambient operating temperature range and another curvature wherein the bimetallic member is loosely disposed therebetween when the ambient temperature is within the normal ambient operating temperature range.

12. A float-controlled valve for controlling the flow of two immiscible fluids, at least the heavier of which is a liquid, said valve comprising a fixed cylindrical seat member and a movable member operatively connected thereto, said seat member having an inlet port and an outlet port in communication with the inlet port and including an elongate guide stem projecting axially therefrom, said movable member including a tubular valve member slidable over said seat member and a float ballasted to be buoyantly supported by said heavier fluid and to sink in said lighter fluid at normal ambient operating temperatures, said float being slidable on said stem and connected to said valve member for movement of the latter into and out of closing relationship with the inlet port in accordance with the level of a liquid by which the float is buoyantly supported, said seat member being formed of material having a lower coefficient of linear expansion than the material of which the valve member is formed, the clearance between the seat member and valve member being such that at temperatures within the normal ambient operating temperature range the valve member freely slides over the seat member, while at a predetermined temperature below the normal ambient operating temperature range the valve member will contract to a diameter smaller than the diameter of the seat member.

13. A float-controlled valve for controlling the flow of two immiscible fluids, at least the heavier of which is a liquid, said valve comprising a seat member and a movable member operatively associated with said seat member, said seat member having an inlet port and an outlet port in communication with the inlet port, said movable member including a valve member and a float ballasted to be buoyantly supported by said heavier fluid and to sink in said lighter fluid at normal ambient operating temperatures, said float being connected to said movable valve member for movement of the latter into and out of closing relationship with the inlet port in accordance with the level of the heavier fluid by which the float is buoyantly supported, and temperature-responsive, valve holding means including mutually engageable elements on said seat member and said movable member respectively, said means being inactive within the normal ambient operating temperature range and active when the ambient temperature decreases to a predetermined value below the normal ambient operating temperature range for holding said movable member against movement into valve closing position to thereby prevent closing of said valve upon an increase in specific gravity of the lighter fluid by reason of said temperature decrease.

References Cited in the file of this patent
UNITED STATES PATENTS

| | | |
|---|---|---|
| 1,425,857 | Harrison | Aug. 15, 1922 |
| 1,513,547 | Goff | Oct. 28, 1942 |
| 2,283,311 | Bevins | May 19, 1942 |
| 2,547,098 | Smith et al. | Apr. 3, 1951 |
| 2,622,408 | Ray | Dec. 23, 1952 |